3,017,388
RESINOUS POLYMERS FROM REACTION OF BIS(ACETOACETATES) AND BIS(ACETOACET-AMIDES) WITH DIAMINES
John R. Caldwell and James C. Martin, Kingsport, Tenn., assignors to Eastman Kodak Company, Rochester, N.Y., a corporation of New Jersey
No Drawing. Filed Apr. 17, 1958, Ser. No. 729,056
11 Claims. (Cl. 260—65)

This invention relates to resinous condensation polymers prepared by reacting bis(acetoacetates) and bis-(acetoacetamides) with various aliphatic and aryl diamines.

The new resinous polymers of the invention are represented by one or other of the following recurring structural units:

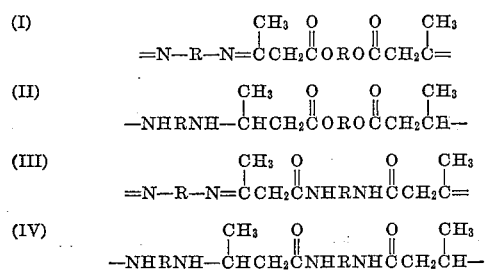

wherein in each instance R represents an alkylene group containing from 2 to 12 carbon atoms e.g. —CH$_2$—, —C$_2$H$_4$—, —C$_3$H$_6$—, —C$_4$H$_8$—, —C$_{12}$H$_{24}$—, etc., an alkylene group containing from 2–8 carbon atoms interrupted with —O— or —NH— linkages e.g.

—CH$_2$—O—C$_2$H$_4$—,   —C$_2$H$_4$—NH—C$_2$H$_4$—
—C$_4$H$_8$—O—C$_4$H$_8$—,   —C$_4$H$_8$—NH—C$_4$H$_8$— etc. an arylene group such as a phenylene group, a diphenylene group, a —CH$_2$C$_6$H$_4$CH$_2$— group, or a —C$_6$H$_4$—Y—C$_6$H$_4$— group, wherein Y represents —CH$_2$—,  —O—,  —C$_2$H$_4$—,  —CH(CH$_3$)—
—CH(CH$_3$)CH$_2$—,  —OC$_2$H$_4$O—,  —SO$_2$—,  —S—
—CF$_2$—,  —OCH$_2$C$_6$H$_4$CH$_2$O—,  —N(CH$_3$)—
—CONH—,  —C(CH$_3$)$_2$— and the like. The polymers represented by above structural units designated 2 and 4 are the hydrogenated products of the above structural units designated 1 and 3, respectively. The above defined polymers of the invention are insoluble in most common organic solvents, but dissolve in acrylonitrile polymer solvents such as dimethylacetamide, dimethylformamide, etc. Some of the polymers are soluble to some extent in dilute acids such as hydrochloric acid and can be readily regenerated therefrom by the addition of ammonium hydroxide or alkali metal hydroxides such as sodium hydroxide. Solutions of the polymers on coating give clear, hard and brittle films, which have good antistatic properties making the polymers particularly useful for antistatic coatings on films and textile yarns and fabrics. The polymers are also compatible with various synthetic materials and can be incorporated, for example, in spinning solutions of cellulose acetate, polyacrylonitrile, acrylonitrile polymers having at least 70% by weight of combined acrylonitrile, and the like, to give fibers having improved dyeing properties.

It is, accordingly, an object of the invention to provide a new class of resinous condensation polymers that are characterized by having good antistatic properties and excellent affinity for commercial dyes. Another object is to provide films and textile fabrics coated with the above polymers. Another object is to provide synthetic fibers having incorporated therein at least one of the above polymers. Another object is to provide a process for preparing the said polymers. Other objects will become apparent hereinafter.

In accordance with the invention, we prepare our new polymers by heating a bis(acetoacetate) or a bis(acetoacetamide) with a molar equivalent of a diamine, either in a solvent or melt in the presence of an acid catalyst to give a unsaturated linear polymer represented by above structural units I or III. The melt tends to give higher molecular weight products. If a medium or low molecular weight product is desired, the reaction is advantageously carried out in a liquid medium in which the monomers, but not the resulting polymers are soluble. In this case the reaction temperature is preferably maintained at the refluxing temperature of the mixture. Suitable liquid mediums include, for example, 1,2-diethoxyethane and dimethylformamide. Suitable acid catalysts include sulfuric acid, p-toluenesulfonic acid, zinc chloride, etc. However, the reaction can also be carried out in the absence of any catalyst. The polymer prepared as above described may be isolated and used in this form, or it may be taken into solution, for example, in dimethylformamide and hydrogenated with a metal catalyst such as Raney nickel to give the corresponding saturated linear polymer represented by above structural units II or IV.

Suitable intermediate bis(acetoacetates) represented by the general formula:

CH$_3$COCH$_2$COOROCOCH$_2$COCH$_3$ wherein R is as previously defined, include ethylenebis (acetoacetate), the propylenebis (acetoacetates), the butylenebis (acetoacetates), the phenylenebis (acetoacetates), p,p'-methylene - bis (phenylacetoacetate), p,p'-ethylenebis (phenylacetoacetate), p,p'-sulfonylbis (phenylacetoacetate), etc. Suitable intermediate bis(acetoacetamides) represented by the general formula:

CH$_3$COCH$_2$CONHRNHCOCH$_2$COCH$_3$ wherein R is as previously defined, includes N,N'-methylenebis (acetoacetamide), N,N'-ethylenebis (acetoacetamide), the N,N'-propylenebis (acetoacetamides), the N,N'-butylenebis (acetoacetamides), p,p' - methylenebis (N-phenylacetoacetamide), p,p'-sulfonylbis (N-phenylacetoacetamide), etc. The above intermediates can be prepared by known methods, for example, by reacting diketene with an appropriate glycol or diamine.

Suitable diamines employed with the above intermediaes to obtain the polymers of the invention are represented by the general formula:

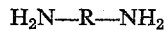

H$_2$N—R—NH$_2$ wherein R is as previously defined, include ethylene diamine, the propylene diamines, the butylene diamines, the hexanediamines, the dodecanediamines, phenylene diamines, the tolidines, the methylenebis anilines, m-xylene-α,α'-diamine, etc.

The following examples further illustrate the invention.

*Example 1*

A mixture of 4.56 g. (.02 mole) of N,N'-ethylenebis (acetoacetamide), 3.96 g. (.02 mole) of 4,4'-methylenebisaniline, 50 ml. of 1,2-diethoxyethane and 0.1 g. p-toluenesulfonic acid was refluxed for 2 hrs. About 5 ml. of distillate was removed at top of a short Vigreaux column. A gummy polymer came out of solution during this heating period. The liquid was decanted from the polymer. A film cast from this polymer was clear, hard and brittle. The polymer was insoluble in acetone and isopropanol, but soluble in dimethylformamide. It consisted essentially of the following recurring unit:

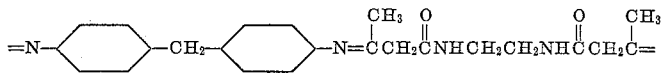

*Example 2*

A mixture of 36.6 g. (0.1 mole) of p,p'-methylenebis (N-phenylacetoacetamide), 11.6 g. (0.1 mole) of 1,6-hexanediamine and 250 ml. of dimethylformamide was refluxed for 2 hours. All low boilers were taken off at the top of a short Vigreaux column. The polymer was completely dissolved while the solution was hot, but it precipitated out on cooling. The warm solution was charged into a stainless steel, rocking autoclave, together with 5 g. of Raney nickel; then hydrogenated at 50° C. and 1500 p.s.i. The resulting polymer was precipitated by pouring the reaction solution into 1000 ml. of rapidly stirred methanol. The polymer was mostly soluble in dilute hydrochloric acid and could be regenerated by the addition of sodium hydroxide. It was useful for anti-halation coatings and in other photographic uses, as well as being useful for impregnating textile fabrics to reduce frictional static effects. The polymer consisted essentially of the following recurring unit:

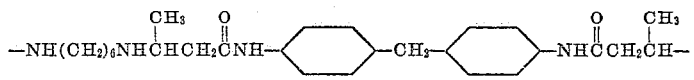

*Example 3*

A mixture of 18.3 (.05 mole) of p,p'-methylenebis (N-phenylacetoacetamide) and 6.8 g. (.05 mole) of m-xylene-α,α'-diamine were stirred at 240° C. for 30 minutes, then subjected to a vacuum of 1 mm. to remove the last traces of low boiling material. The polymer became increasingly more viscous during the latter stages of heating and stirring. The product upon cooling was a hard, brittle polymer that gave brittle fibers. It was useful as an antistatic additive in spinning solutions. The polymer consisted essentially of the following recurring unit:

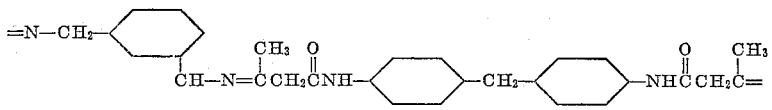

*Example 4*

A mixture of 41.8 g. (0.1 mole) of p,p'-sulfonylbis (phenylacetoacetate), 14.2 g. (0.1 mole) of 1,4-cyclohexanedi(methylamine) and 200 ml. of dimethylformamide were reacted and hydrogenated as described in Example 2. The resulting polyamine was soluble in dimethylformamide and hot acetic acid and was useful for antihalation coatings on photographic film supports. It consisted essentially of the following recurring units:

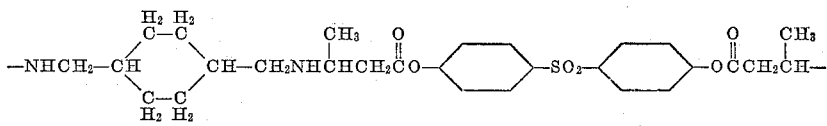

By processed as described in the above examples, other polymers having generally similar properties may be prepared from any of the mentioned intermediate bis-(acetoacetates) or bis(acetoacetamides) with any of the mentioned diamines. All of the polymers of the invention are resinous in character and may be worked up in any one of several manners, for example, cast as a film from solution, used as a solution, or precipitated by pouring a solution of the polymer into a rapidly stirred non-solvent. When used as modifying additives in other synthetic polymer with which they are compatible, improving affinity for acid dyes of products thereof is obtained.

The invention has been described in detail with particular reference to preferred embodiments thereof, but it will be understood that variations and modifications can be effected within the spirit and scope of the invention as hereinabove and as defined in the appended claims.

What we claim is:

1. A process for preparing a resinous film-forming polymer which comprises heating at about from 121° to 240° C. an acetoacetic acid derivative selected from the group consisting of compounds having the following general formulas:

and

wherein R is selected from the group consisting of an alkylene group containing from 2–12 carbon atoms, a phenylene group, a diphenylene group, a —$CH_2C_6H_4CH_2$— group, and a —$C_6H_4$—Y—$C_6H_4$— group wherein Y represents —O—, —S—, —$SO_2$—, —$CH_2$—, —$C_2H_4$—, —$CH(CH_3)$—, —$CH(CH_3)CH_2$—, —$CF_2$—, —$OC_2H_4O$—, —$OCH_2C_6H_4CH_2O$—, —$N(CH_3)$—, —CONH— and —$C(CH_3)_2$—, with a diamine represented by the following general formula:

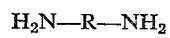

wherein R is as above defined, in the proportions of 1 mole of the said acetoacetic acid derivative per mole of the said diamine.

2. A process for preparing a resinous film-forming polymer which comprises heating at about from 121° to 240° C. equimolar proportions of N,N'-ethylenebis (acetoacetamide) and 4,4'-methylenebisaniline.

3. A process for preparing a resinous film-forming polymer which comprises heating at about from 121° to 240° C. equimolar proportions p,p'-methylenebis (N-phenylacetoacetamide) and 1,6-hexanediamine, and then hydrogenating the resinous polymer obtained to reduce just the nitrogen to carbon double bonds therein.

4. A process for preparing a resinous film-forming polymer which comprises heating at about from 121° to 240° C. equimolar proportions of p,p'-methylenebis (N-phenylacetoacetamide) and m-xylene-α,α'-diamine.

5. A process for preparing a resinous film-forming polymer which comprises heating at about from 121° to 240° C. equimolar proportions of p,p'-sulfonylbis (phenylacetoacetate) and 1,4-cyclohexanedi(methylamine), and then hydrogenating the resinous polymer obtained to reduce just the nitrogen to carbon double bonds therein.

6. The process of claim 1 wherein the resinous film-forming polymer obtained is hydrogenated to reduce just the nitrogen to carbon double bonds therein.

7. A resinous film-forming polymer obtained according to the process of claim 1.

8. The resinous film-forming polymer according to the process of claim 2.

9. The resinous film-forming polymer according to the process of claim 3.

10. The resinous film-forming polymer according to the process of claim 4.

11. The resinous film-forming polymer obtained according to the process of claim 5.

References Cited in the file of this patent

UNITED STATES PATENTS

| | | |
|---|---|---|
| 2,149,678 | Hovey | Mar. 7, 1939 |
| 2,176,074 | Jacobson | Oct. 17, 1939 |
| 2,195,570 | Hovey | Apr. 2, 1940 |
| 2,730,517 | Vogel et al. | Jan. 10, 1956 |
| 2,757,164 | Block et al. | July 31, 1956 |
| 2,759,913 | Hulse | Aug. 21, 1956 |

FOREIGN PATENTS

| | | |
|---|---|---|
| 523,256 | Great Britain | July 10, 1940 |